United States Patent
Moon et al.

(10) Patent No.: US 11,108,332 B2
(45) Date of Patent: Aug. 31, 2021

(54) HALF-BRIDGE CONVERTER INCLUDING RECTIFIER STRUCTURE USING COUPLING INDUCTOR

(71) Applicant: Korea Advanced Institute of Science and Technology, Daejeon (KR)

(72) Inventors: Gun-Woo Moon, Daejeon (KR); Jung-Kyu Han, Daejeon (KR); Seung-Hyun Choi, Daejeon (KR); Jong-Woo Kim, Daejeon (KR); Keon-Woo Kim, Daejeon (KR); Cheon-Yong Lim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/732,751

(22) Filed: Jan. 2, 2020

(65) Prior Publication Data
US 2020/0220467 A1    Jul. 9, 2020

(30) Foreign Application Priority Data
Jan. 3, 2019    (KR) .................. 10-2019-0000669

(51) Int. Cl.
H02M 3/335 (2006.01)
(52) U.S. Cl.
CPC ... *H02M 3/33576* (2013.01); *H02M 3/33507* (2013.01)

(58) Field of Classification Search
CPC ........ H02M 3/24; H02M 3/325; H02M 3/335; H02M 3/33576; H02M 3/33507; H02M 3/33584; H02M 3/33592
See application file for complete search history.

(56) References Cited

U.S. PATENT DOCUMENTS

| | | | | |
|---|---|---|---|---|
| 2010/0109533 A1* | 5/2010 | Komatsu | ............ | H05B 41/2928 315/119 |
| 2010/0194303 A1* | 8/2010 | Komatsu | ............... | H05B 41/382 315/224 |
| 2014/0368120 A1* | 12/2014 | Kumar | ............... | H05B 41/2988 315/201 |
| 2015/0303788 A1* | 10/2015 | Leu | .......................... | H02M 7/48 363/84 |

(Continued)

*Primary Examiner* — Adolf D Berhane
(74) *Attorney, Agent, or Firm* — Hamilton, Brook, Smith & Reynolds, P.C.

(57) ABSTRACT

Disclosed is an asymmetrical half-bridge converter having high efficiency in a wide input voltage range. The converter may include a primary-side circuit including a first switch, a second switch, a primary-side capacitor, an additional inductor, and a primary-side magnetization inductor, and a secondary-side circuit including first and second diodes connected in series, first and second capacitors connected in series, a secondary-side rectification inductor having one end connected to the anode of the first diode and cathode of the second diode, and having the other end connected between the first and second capacitors connected in series, a first coupling inductor having one end connected to the cathode of the first diode and having the other end connected to the first capacitor, and a second coupling inductor having one end connected to the anode of the second diode and having the other end connected to the second capacitor.

15 Claims, 21 Drawing Sheets

(56) References Cited

U.S. PATENT DOCUMENTS

2016/0072387 A1* 3/2016 Schmalnauer ...... H02M 3/1582
                                              323/271
2018/0115247 A1* 4/2018 Schekulin ............ H02H 7/1213
2020/0375002 A1* 11/2020 Das ..................... H05B 45/382

* cited by examiner

HALF-BRIDGE CONVERTER INCLUDING RECTIFIER STRUCTURE USING COUPLING INDUCTOR

CROSS REFERENCE TO RELATED APPLICATION

This application is based on and claims priority under 35 U.S.C. 119 to Korean Patent Application No. 10-2019-0000669, filed on Jan. 3, 2019, in the Korean Intellectual Property Office, the disclosures of which is herein incorporated by reference in their entireties.

BACKGROUND OF THE INVENTION

1. Technical Field

The present disclosure relates to a half-bridge converter including a rectifier structure using a coupling inductor.

2. Description of the Related Art

Among various DC/DC converters, an asymmetrical half-bridge converter is a topology suitable for being used for a low-capacity and high-efficiency power supply, such as TV or an LED, due to characteristics having a small number of elements and capable of a zero-voltage switching operation of a primary-side switch. However, if the asymmetrical half-bridge converter is designed by considering a wide input voltage range in order to satisfy the hold-up condition of the power supply, it has a problem in that a high DC offset current is generated in a transformer because the primary-side switch asymmetrically operates when the input voltage is high. The asymmetrical half-bridge converter needs to use a magnetic body having a large volume compared to a conventional technology in order to prevent the saturation of the magnetic body attributable to such a DC offset current. This is one of major causes to increase costs and volume and reduce efficiency. Furthermore, the asymmetrical half-bridge converter has a problem in that zero-voltage switching is rarely performed because the transformer has a positive DC offset current and thus a negative current for the zero-voltage switching of the switch Q2 is reduced.

SUMMARY OF THE INVENTION

The disclosure provides an asymmetrical half-bridge converter, which has a small number of elements and from which the DC offset current of a transformer has been removed by applying a rectifier having a new structure using a coupling inductor so that the asymmetrical half-bridge converter is suitable for being used for a low-capacity and high-efficiency power supply.

An asymmetrical half-bridge converter having high efficiency in a wide input voltage range, which is proposed in the disclosure, includes a primary-side circuit including a first switch, a second switch, a primary-side capacitor, an additional inductor, and a primary-side magnetization inductor, and a secondary-side circuit, including a first diode and second diode which are connected in series, a first capacitor and second capacitor which are connected in series, a secondary-side rectification inductor having one end connected to the anode of the first diode and cathode of the second diode, which are connected in series, and having the other end connected between the first capacitor and the second capacitor which are connected in series, a first coupling inductor having one end connected to the cathode of the first diode and having the other end connected to the first capacitor, and a second coupling inductor having one end connected to the anode of the second diode and having the other end connected to the second capacitor.

In the proposed asymmetrical half-bridge converter, a DC offset current of the secondary-side circuit is removed by the first coupling inductor and second coupling inductor of the secondary-side circuit In the proposed asymmetrical half-bridge converter, an average current flowing into the first capacitor and the second capacitor is set to 0 and an average current flowing into the secondary-side circuit becomes 0 regardless of an operation of the switches of the primary-side circuit.

In the proposed asymmetrical half-bridge converter, a range of an input voltage is widened and the size of the converter is reduced by removing the DC offset current of the secondary-side circuit.

In the proposed asymmetrical half-bridge converter, zero-voltage switching efficiency of the switches is improved by increasing a negative current of the primary-side circuit.

A voltage gain ($V_O/V_S$) of the proposed asymmetrical half-bridge converter is equal to an equation below.

$$V_O/V_S = 2D_{Q1}/n$$

wherein $D_{Q1}$ is a duty cycle of the first switch of the primary-side circuit, and n is a turn ratio of the primary-side circuit and the secondary-side circuit.

The zero-voltage switching conditions of the first switch and second switch of the primary-side circuit of the proposed asymmetrical half-bridge converter are equal to equations below, respectively.

$$\tfrac{1}{2}L_{lkg}(-2I_O/n)^2 \geq C_{OSS}V_S^2$$

$$\tfrac{1}{2}L_m(2I_O/n)^2 \geq C_{OSS}V_S^2$$

wherein $L_{lkg}$ is the additional inductor of the primary-side circuit, $I_O$ is an output current of the secondary-side circuit, n is a turn ratio of the primary-side circuit and the secondary-side circuit, and $C_{oss}$ is an output capacitor of the primary-side circuit.

An operating method of an asymmetrical half-bridge converter having high efficiency in a wide input voltage range includes a step in which the first switch of a primary-side circuit is turned on and the first diode of a secondary-side circuit is turned on, a step in which the first switch of the primary-side circuit is turned off and the first diode of the secondary-side circuit is turned on, a step in which the second switch of the primary-side circuit is turned on, the first diode of the secondary-side circuit is turned on, and the second diode of the secondary-side circuit is turned on, a step in which the second switch of the primary-side circuit is turned on and the second diode of the secondary-side circuit is turned on, and a step in which the second switch of the primary-side circuit is turned off and the second diode of the secondary-side circuit is turned on.

DETAILED DESCRIPTION

Embodiments of the disclosure propose an asymmetrical half-bridge converter having high efficiency in a wide input voltage range.

Figure 1A:
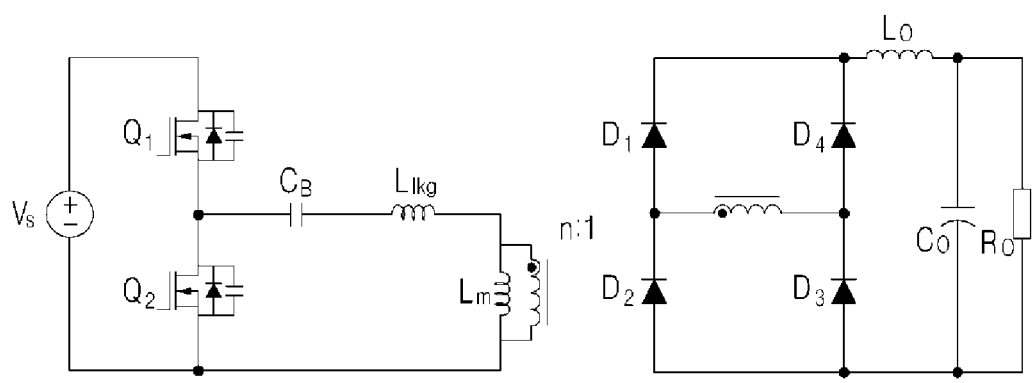
FIG. 1A is a circuit diagram of the asymmetrical half-bridge converter according to a conventional technology.
Figure 1B:
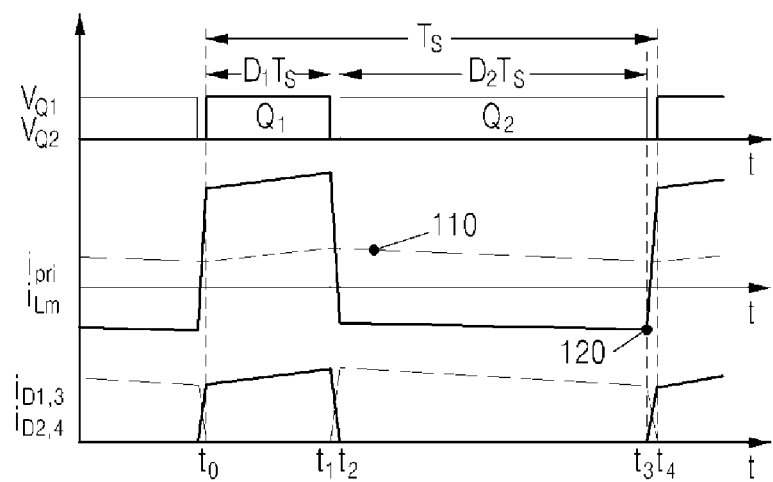
FIG. 1B shows major waveforms of the asymmetrical half-bridge converter according to the conventional technology.

FIG. 1A-1B is a diagram for describing characteristics of an asymmetrical half-bridge converter according to a conventional technology.

Among various DC/DC converters, the asymmetrical half-bridge converter of FIG. 1A is a topology widely used for the power supply of a low capacity due to characteristics having a small number of elements and capable of zero-voltage switching. However, if the asymmetrical half-bridge converter is designed in a wide input voltage range, it has a high DC offset current in a transformer. Accordingly, as shown in FIG. 1B, the asymmetrical half-bridge converter has problems in that it increases the size of the transformer and reduces zero-voltage switching energy. In order to solve the problems, in a proposed circuit, the offset current of the transformer is removed using a rectifier having a new structure using a coupling inductor. Accordingly, the proposed circuit has high efficiency even in a wide input voltage range by solving a problem occurring due to the offset current. Hereinafter, embodiments of the disclosure are described in detail with reference to the accompanying drawings.

Figure 2A:
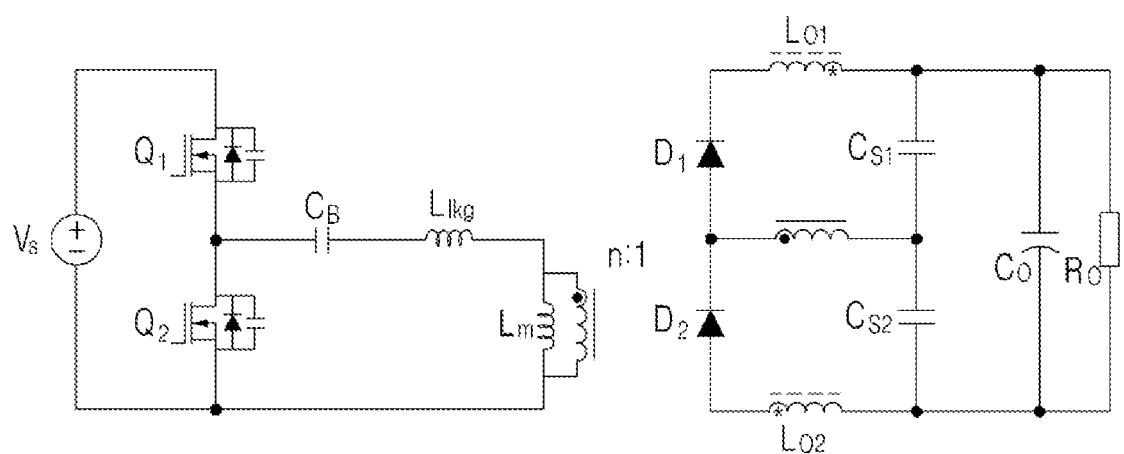
FIG. 2A is a circuit diagram of the asymmetrical half-bridge converter according to an embodiment of the disclosure.
Figure 2B:
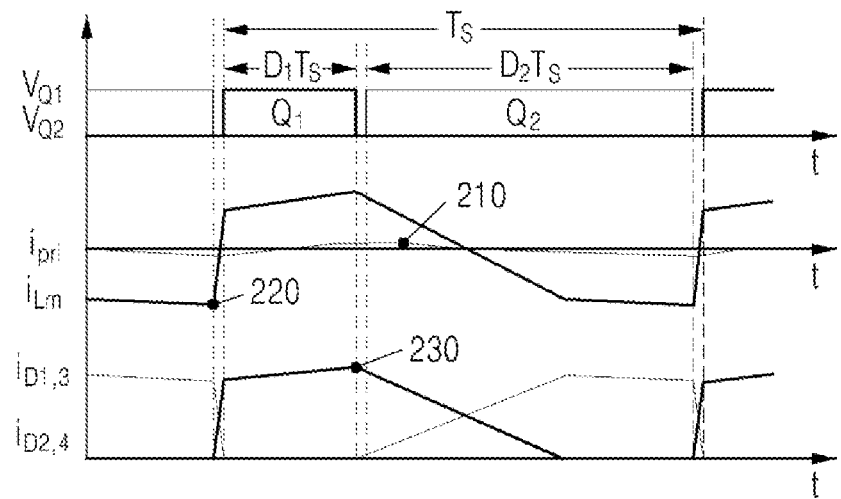
FIG. 2B shows major waveforms of the asymmetrical half-bridge converter according to an embodiment of the disclosure.

FIG. 2A-2B is a diagram for describing characteristics of the asymmetrical half-bridge converter according to an embodiment of the disclosure.

The proposed asymmetrical half-bridge converter includes a primary-side circuit, including a first switch $Q_1$, a second switch $Q_2$, a primary-side capacitor $C_B$, an additional inductor $L_{lkg}$, and a primary-side magnetization inductor $L_m$, and a secondary-side circuit, including a first diode $D_1$ and second diode $D_2$ that are connected in series, a first capacitor $C_{S1}$ and second capacitor $C_{S2}$ that are connected in series connected, a secondary-side rectification inductor having one end connected to the anode of the first diode $D_1$ and cathode of the second diode $D_2$ that are connected in series and having the other end connected between the first capacitor $C_{S1}$ and the second capacitor $C_{S2}$ that are connected in series, a first coupling inductor $L_{O1}$ having one end connected to the cathode of the first diode $D_1$ and having the other end connected to the first capacitor $C_{S1}$, and a second coupling inductor $L_{O2}$ having one end connected to the anode of the second diode $D_2$ and having the other end connected to the second capacitor $C_{S2}$.

In the proposed asymmetrical half-bridge converter, the DC offset current of the secondary-side circuit can be removed due to the first coupling inductor and second coupling inductor of the secondary-side circuit. An average current flowing into the first capacitor and the second capacitor is set to 0 regardless of an operation of the switches of the primary-side circuit, so an average current flowing into the secondary-side circuit becomes 0. Accordingly, the range of an input voltage is widened and the size of the converter can be reduced because the DC offset current of the secondary-side circuit is removed. Furthermore, zero-voltage switching efficiency of the switch can be improved by increasing a negative current of the primary-side circuit.

In the structure of the existing asymmetrical half-bridge converter, an output inductor is used as a coupling inductor, and the first capacitors $C_{S1}$ and $C_{S2}$ are used instead of rectifier diodes $D_3$ and $D_4$ shown in FIG. 1. As shown in FIG. 2B, the proposed converter having such a structure does not have the DC offset current of a transformer. Accordingly, the proposed circuit can use a transformer having a small size even in a wide input voltage range, and has an advantage in that the zero-voltage switching of the second switch $Q_2$ is better performed compared to a conventional technology due to a high negative current on the primary side.

Figure 3A:
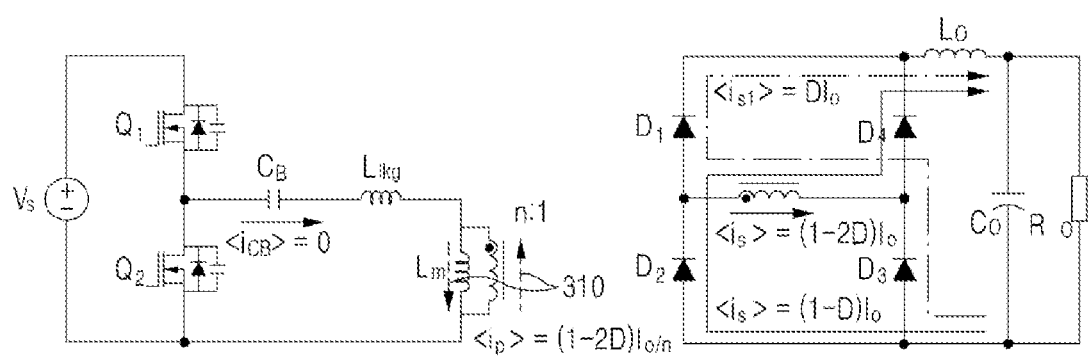
FIG. 3A shows an average current flowing into the rectification stage of an asymmetrical half-bridge converter according to a conventional technology.
Figure 3B:
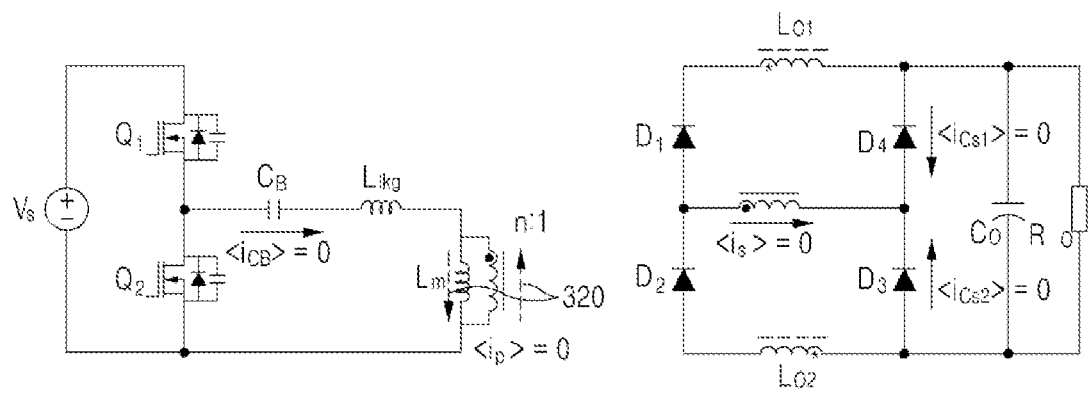
FIG. 3B is a diagram showing an average current flowing into the rectification stage of the asymmetrical half-bridge converter according to an embodiment of the disclosure.

FIG. 3A-3B is a diagram for describing a DC offset current and zero-voltage switching energy according to an embodiment of the disclosure.

As shown in FIG. 3A, in the existing circuit, during a duty cycle $D_{Q1}$ in which the first switch $Q_1$ of the primary-side circuit operates, an output current flows through the first diode $D_1$ and third diode $D_3$ of the secondary-side circuit. While the second switch $Q_2$ of the primary-side circuit is turned on $(1-D_{Q1})$, an output current flows through the second diode $D_2$ and fourth diode $D_4$ of the secondary-side circuit.

Accordingly, a DC offset current is caused in the primary-side circuit because a current $(1-2D_{Q1}) I_O$ flows into the secondary-side circuit of the transformer.

In contrast, as shown in FIG. 3B, in the proposed circuit, an average current flowing into the secondary-side circuit of the transformer becomes 0 because an average current flowing into the first capacitor ($C_{S1}$) and second capacitor ($C_{S2}$) of the secondary-side circuit is set to 0. Accordingly, in the proposed circuit, a DC offset current does not occur in the transformer regardless of the asymmetrical operation of the primary-side switches.

Figure 4A:
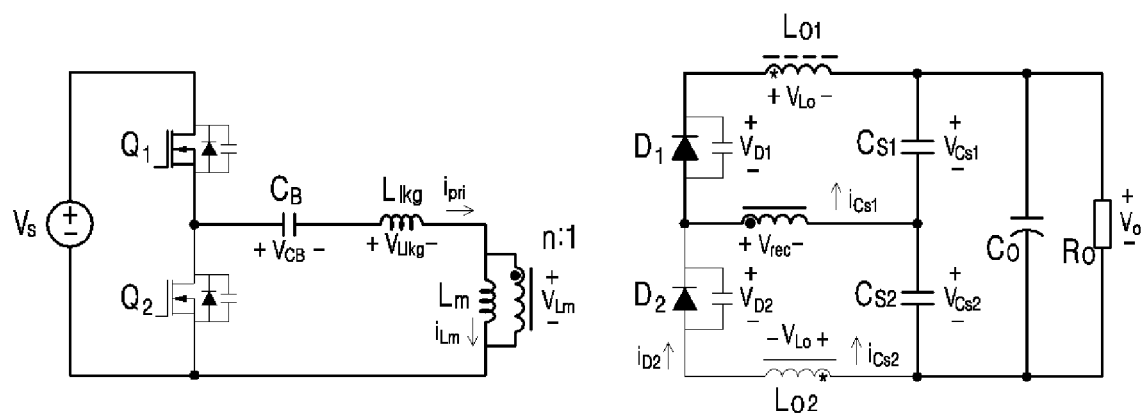
FIG. 4A is a circuit diagram for describing the mode 1 operation of the asymmetrical half-bridge converter according to an embodiment of the disclosure.
Figure 4B:
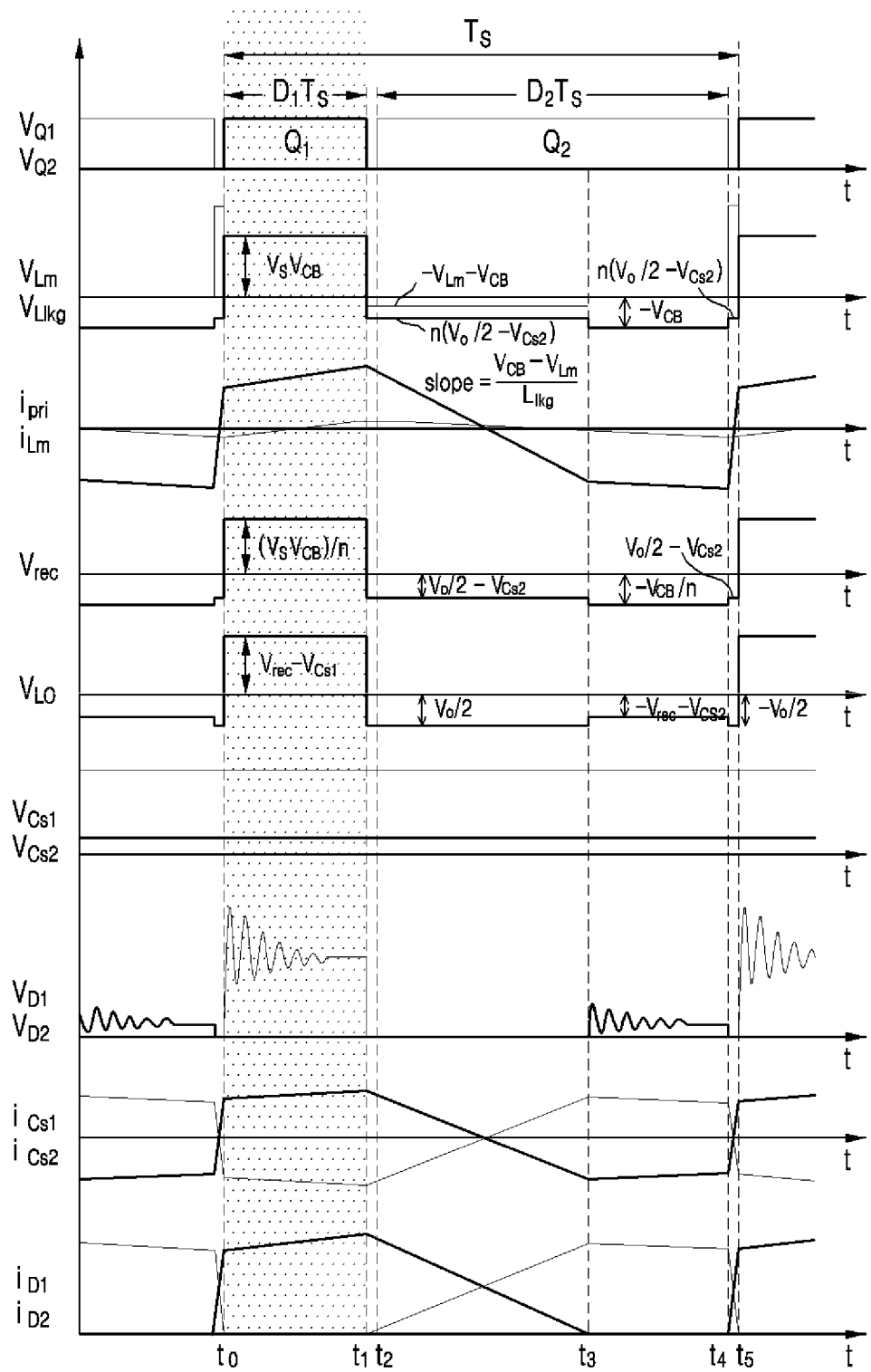
FIG. 4B shows major waveforms in the mode 1 operation.

FIG. 4A-4B is a diagram for describing a mode 1 operation of the asymmetrical half-bridge converter according to an embodiment of the disclosure.

An operating method of the asymmetrical half-bridge converter includes a step (mode 1) in which the first switch of the primary-side circuit is turned on and the first diode of the secondary-side circuit is turned on, a step (mode 2) in which the first switch of the primary-side circuit is turned off and the first diode of the secondary-side circuit is turned on, a step (mode 3) in which the second switch of the primary-side circuit is turned on, the first diode of the secondary-side circuit is turned on, and the second diode of the secondary-side circuit is turned on, a step (mode 4) in which the second switch of the primary-side circuit is turned on and the second diode of the secondary-side circuit is turned on, and a step (mode 5) in which the second switch of the primary-side circuit is turned off and the second diode of the secondary-side circuit is turned on.

In the step (mode 1) in which the first switch of the primary-side circuit is turned on and the first diode of the secondary-side circuit is turned on, an output current flows through the second capacitor and first diode of the secondary-side circuit. In mode 1, a voltage of $V_S-V_{CB}$ is applied to $L_m$ and transmitted to the secondary-side circuit. Thereafter, a voltage of $(V_S-V_{CB})/n-VC_{S1}$ is applied to the output inductor $L_O$ of the secondary-side circuit. As a result, an output current flows through $C_{S2}$ and $D_1$, and the current flowing through $D_1$ becomes $iC_{S2}+iC_{S1}$. In this case, $iC_{S2}$ and $iC_{S1}$ are currents flowing into $C_{S2}$ and $C_{S1}$, respectively.

Figure 5A:
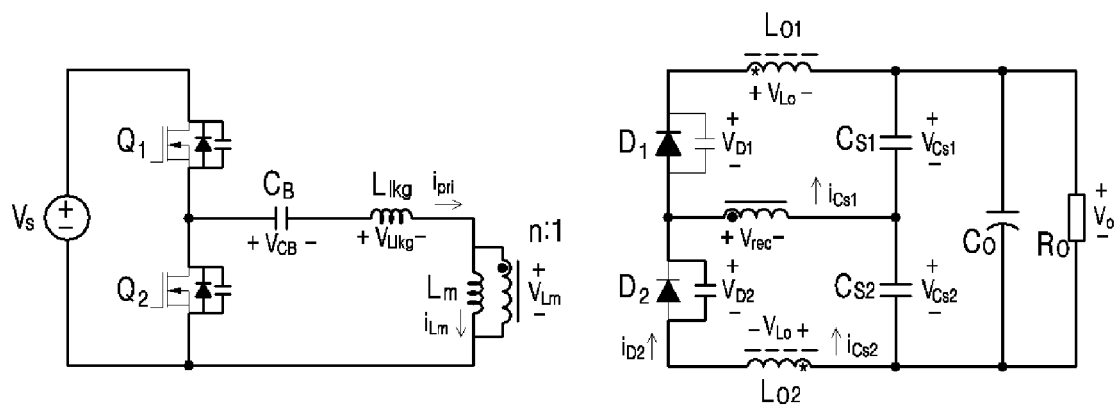
FIG. 5A is a circuit diagram for describing the mode 2 operation of the asymmetrical half-bridge converter according to an embodiment of the disclosure.
Figure 5B:
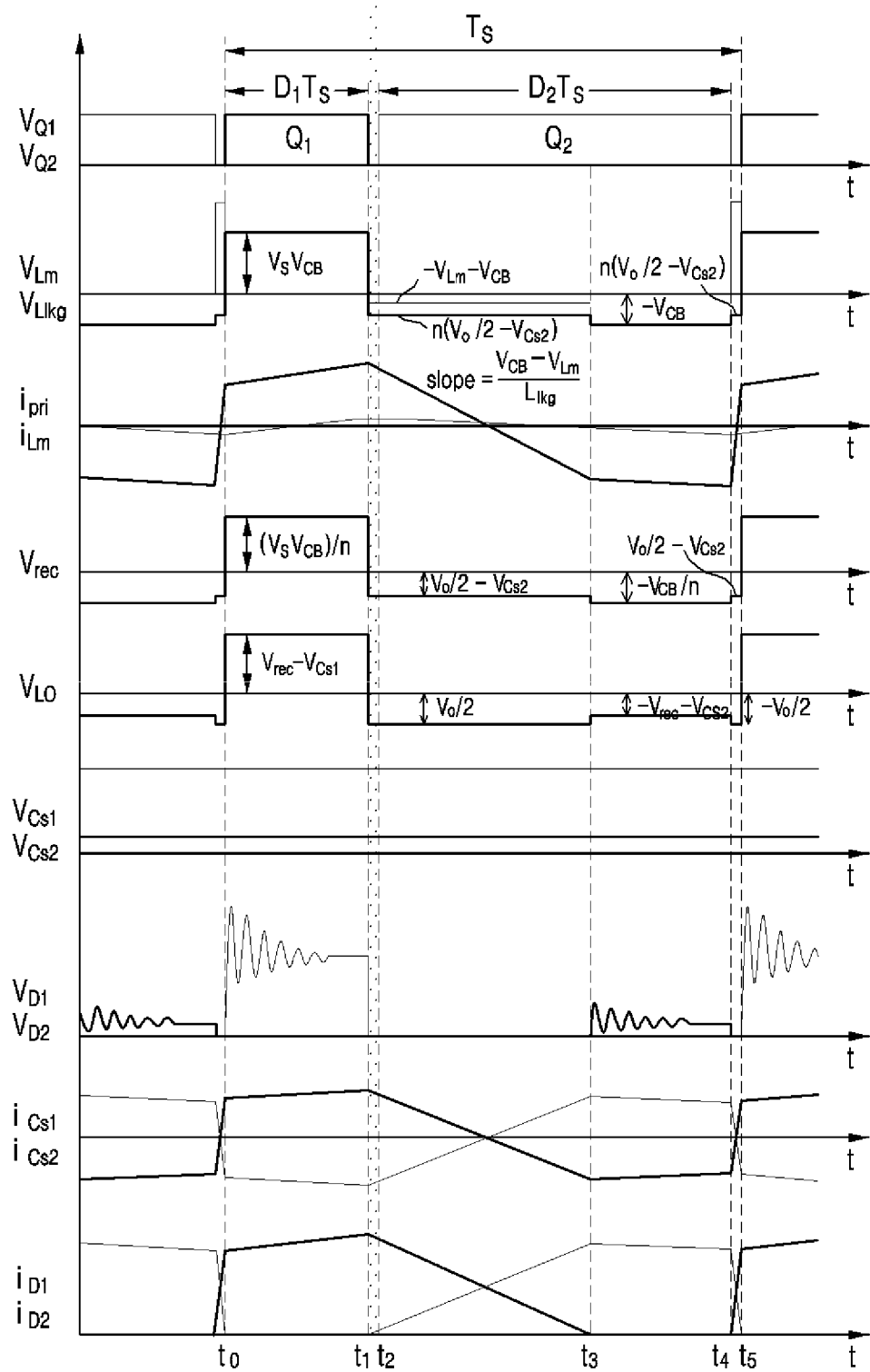
FIG. 5B shows major waveforms in the mode 2 operation.

FIG. 5A-5B is a diagram for describing a mode 2 operation of the asymmetrical half-bridge converter according to an embodiment of the disclosure.

In the step (mode 2) in which the first switch of the primary-side circuit is turned off and the first diode of the secondary-side circuit is turned on, when a voltage of the rectification inductor of the secondary-side circuit reaches a predetermined voltage, the second diode becomes conductive. In mode 2, $Q_2$ is discharged, and $V_{Lm}$ and $V_{rec}$ are decreased. When $V_{rec}$ reaches $V_O/2-VC_{S2}$, D2 becomes conductive. At this time, $V_{rec}=V_O/2-VC_{S2}$, and $V_{Lm}=n(V_O/2-VC_{S2})$. Accordingly, $VD_2$ decreases to $V_{CB}-(V_O/2-VC_{S2})$ by $L_m$ and $L_O$.

Figure 6A:
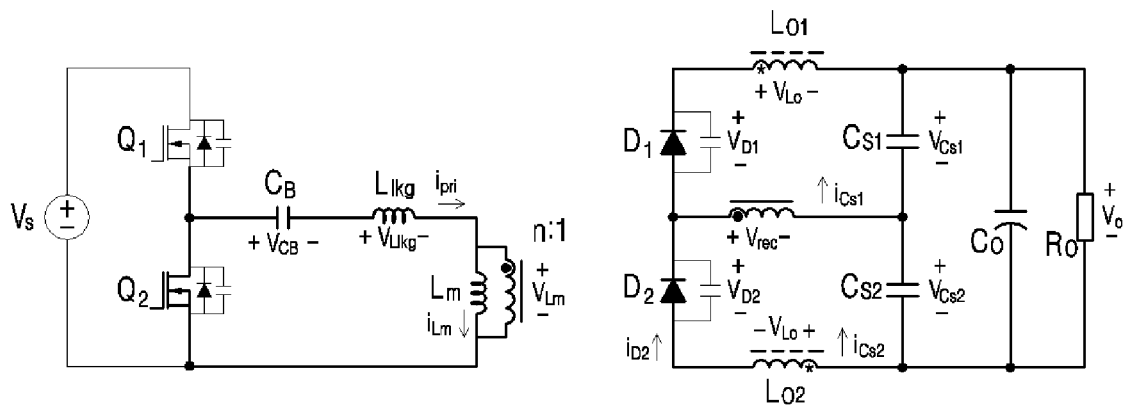
FIG. 6A is a circuit diagram for describing the mode 3 operation of the asymmetrical half-bridge converter according to an embodiment of the disclosure.
Figure 6B:
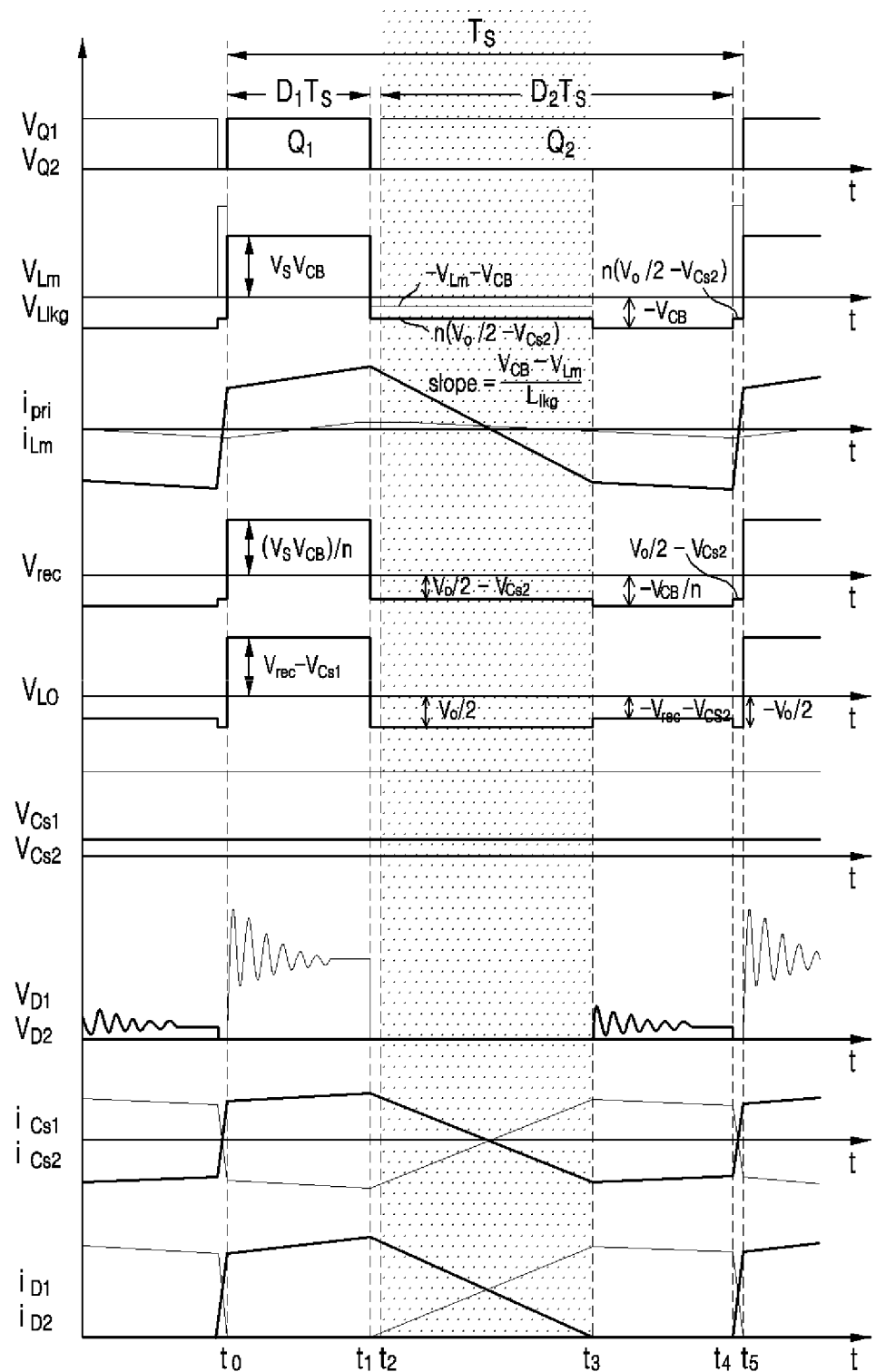
FIG. 6B shows major waveforms in the mode 3 operation.

FIG. 6A-6B is a diagram for describing a mode 3 operation of the asymmetrical half-bridge converter according to an embodiment of the disclosure.

In the step (mode 3) in which the second switch of the primary-side circuit is turned on, the first diode of the secondary-side circuit is turned on, and the second diode of the secondary-side circuit is turned on, if a voltage of the magnetization inductor of the primary-side circuit is fixed to a predetermined voltage, a current flows between the first diode and second diode of the secondary-side circuit. In mode 3, when $V_{Lm}$ is clamped to $n(V_O/2-VC_{S2})$, $V_{Llkg}=-n(V_O/2-VC_{S2})-V_{CB}$. At this time, a current flows between $D_1$ and $D_2$.

Figure 7A:
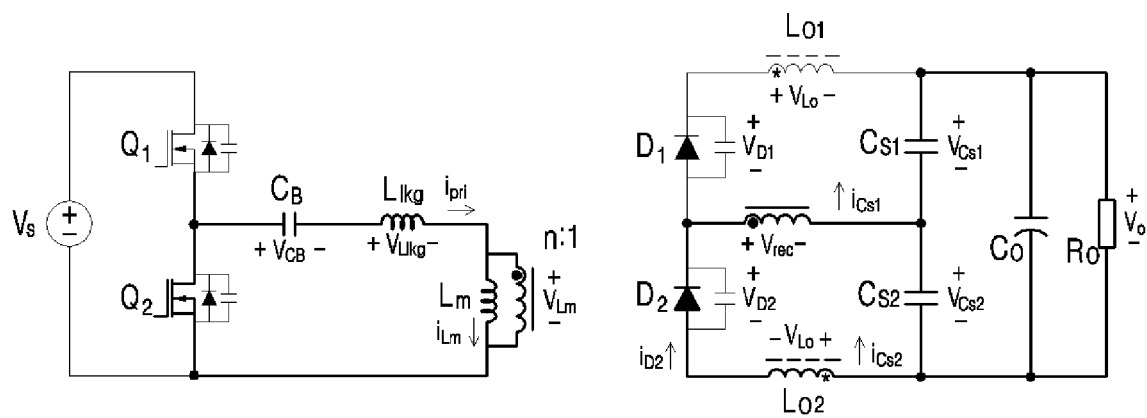
FIG. 7A is a circuit diagram for describing the mode 4 operation of the asymmetrical half-bridge converter according to an embodiment of the disclosure.
Figure 7B:
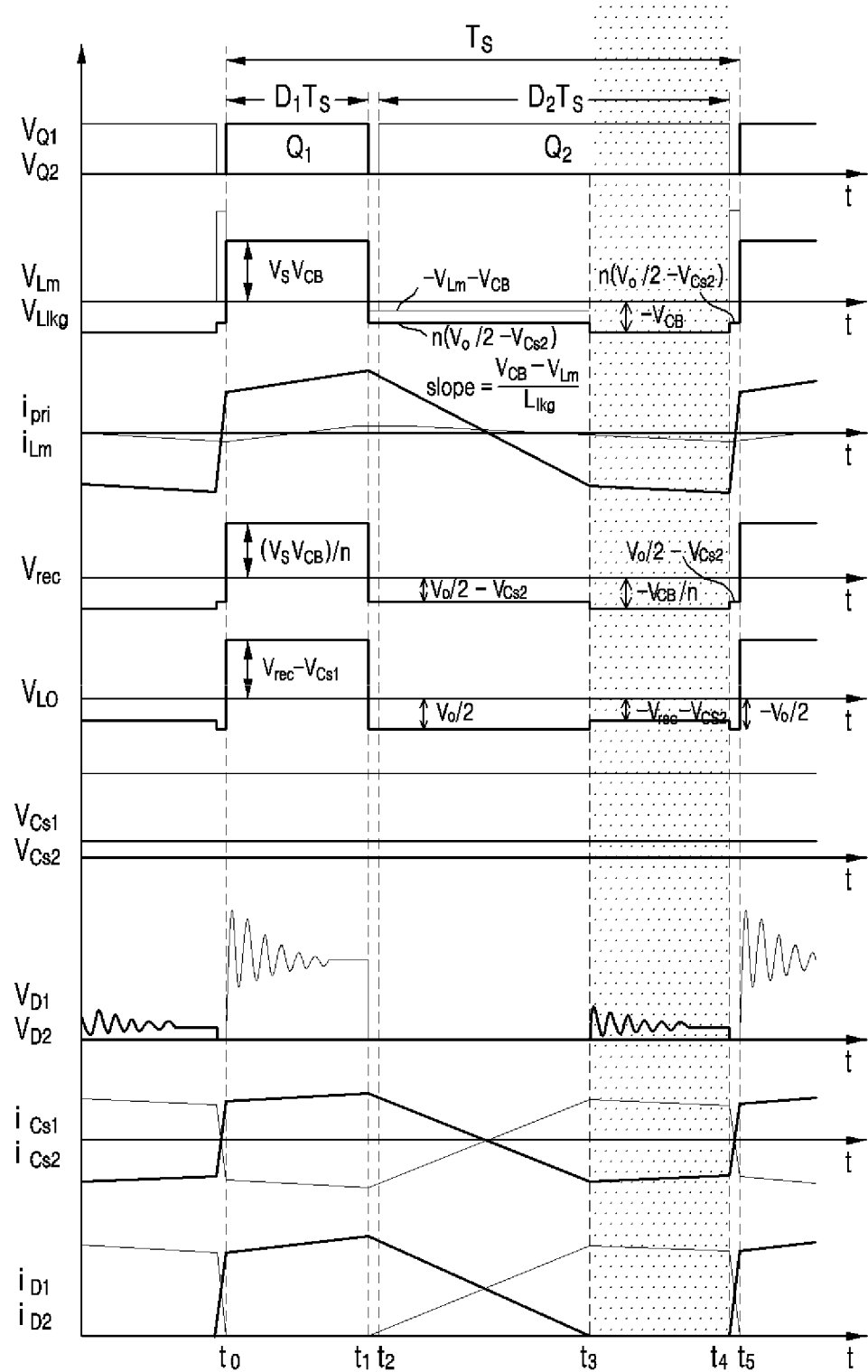
FIG. 7B shows major waveforms in the mode 4 operation.

FIG. 7A-7B is a diagram for describing a mode 4 operation of the asymmetrical half-bridge converter according to an embodiment of the disclosure.

In the step (mode 4) in which the second switch of the primary-side circuit is turned on and the second diode of the secondary-side circuit is turned on, the first diode of the secondary-side circuit is turned off, and an output current flows through the first capacitor and second diode of the secondary-side circuit. In mode 4, a current flowing into the first diode decreases to zero (0), and $D_1$ is turned off. Thereafter, $V_{Lm}$ decreases to $-V_{CB}$, and $V_{rec}$ decreases to $-V_{CB}/n$. Accordingly, a voltage of $V_{rec}-VC_{S2}$ is applied to the output inductor $L_O$ of the secondary-side circuit, and an output current flows through $C_{S1}$ and $D_2$.

Figure 8A:
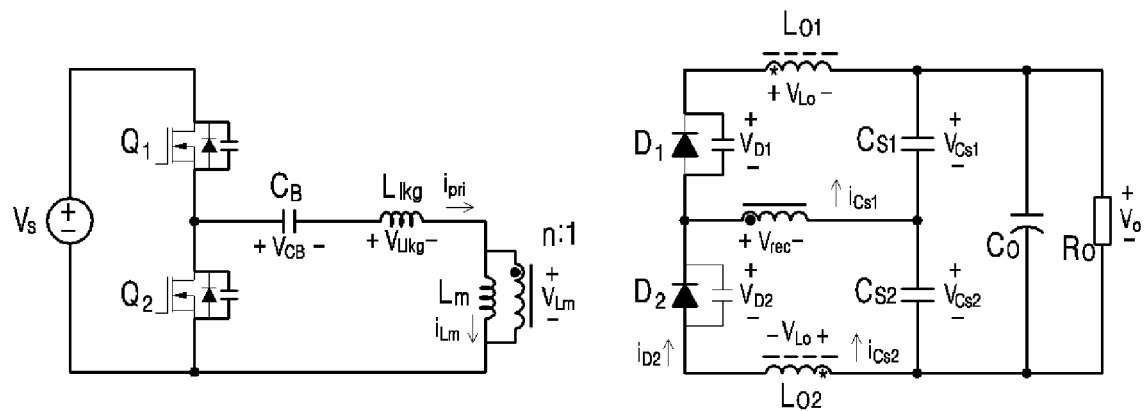
FIG. 8A is a circuit diagram for describing the mode 5 operation of the asymmetrical half-bridge converter according to an embodiment of the disclosure.
Figure 8B:
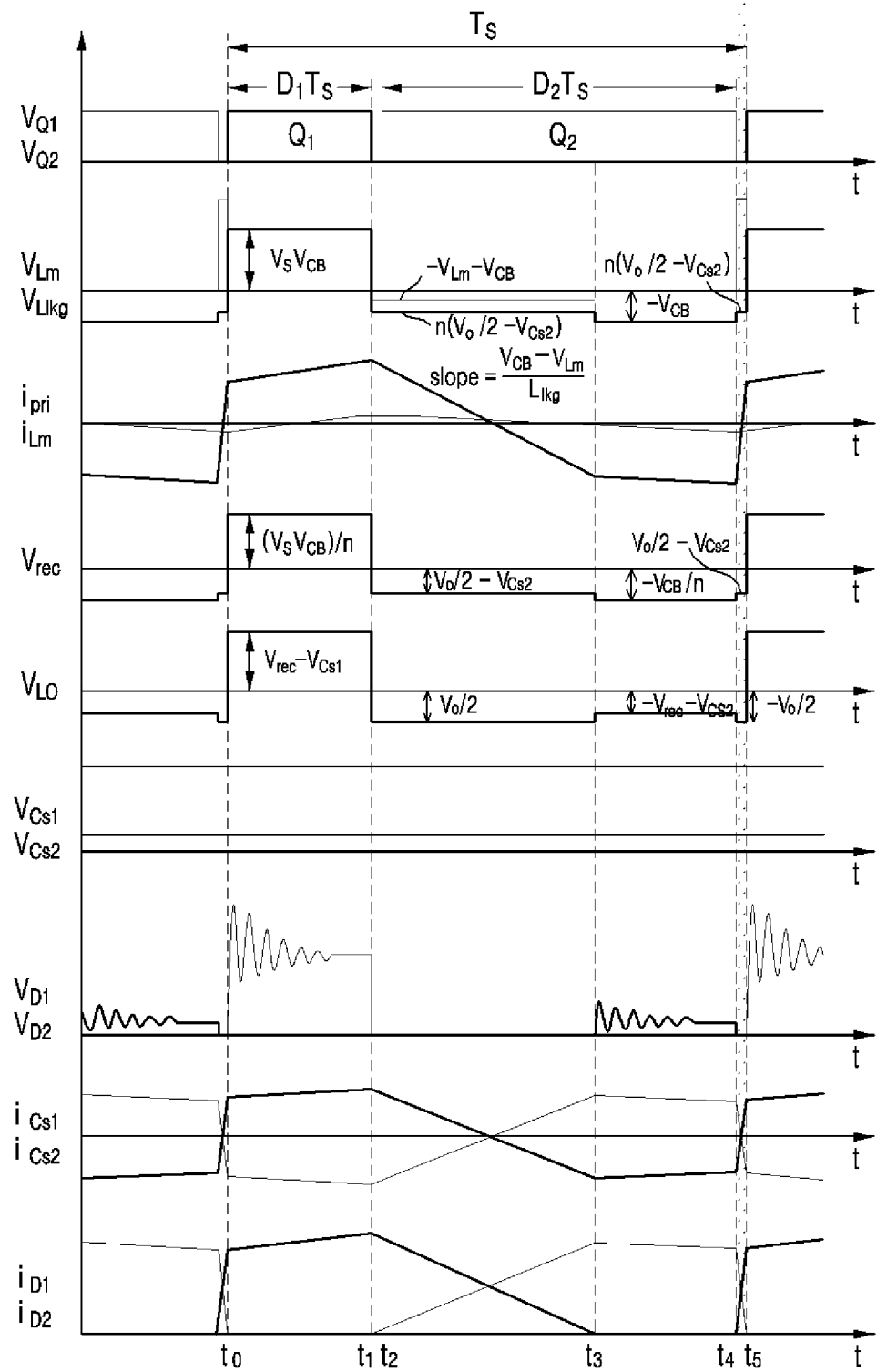
FIG. 8B shows major waveforms in the mode 5 operation.

FIG. 8A-8B is a diagram for describing a mode 5 operation of the asymmetrical half-bridge converter according to an embodiment of the disclosure.

In the step (mode 5) in which the second switch of the primary-side circuit is turned off and the second diode of the secondary-side circuit is turned on, when a voltage of the rectification inductor of the secondary-side circuit reaches a predetermined voltage, the second diode of the secondary-side circuit becomes conductive, and a current flows between the first diode and second diode of the secondary-side circuit. In mode 5, $Q_1$ is discharged, and $V_{Lm}$ and $V_{rec}$ increase. When $V_{rec}$ reaches $V_O/2-VC_{S2}$, $D_2$ becomes conductive. At this time, $V_{rec}=V_O/2-VC_{S2}$, and $V_{Lm}=n(V_O/2-VC_{S2})$. Accordingly, a voltage of $V_{D2}-V_{Lm}-V_{CB}$ is applied to $L_{lkg}$, and a current flows between $D_2$ and $D_1$.

Figure 9:
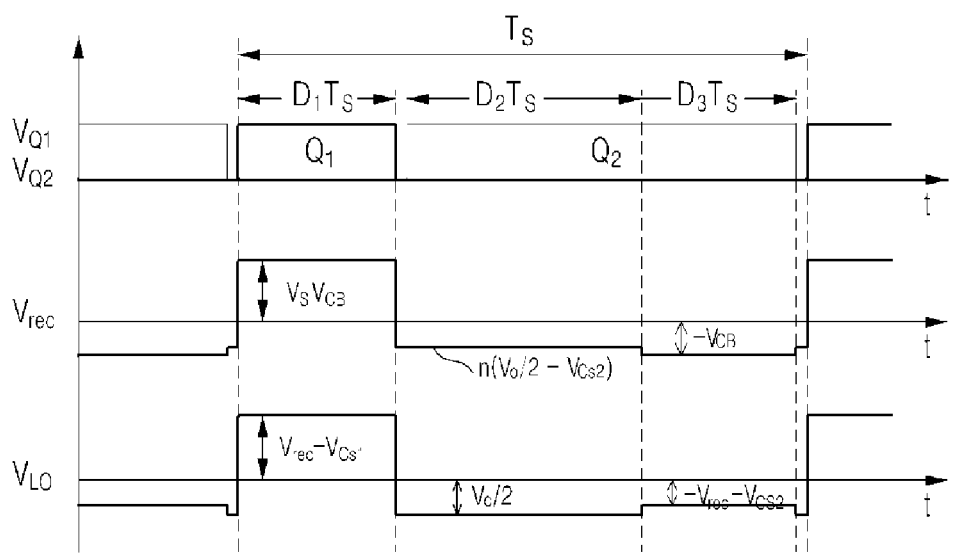
FIG. 9 is a diagram for describing voltage stress of a primary-side magnetization inductor and an output inductor according to an embodiment of the disclosure.

FIG. 9 is a diagram for describing voltage stress of a primary-side magnetization inductor and an output inductor according to an embodiment of the disclosure.

A voltage-second valance in $L_m$ may be represented as follows: $(V_S-V_{CB})\cdot D_1+(n(V_O/2-V_{CS2}))\cdot D_2+D_3=0$ A voltage-second valance in $L_O$ may be represented as follows:

$$(V_{rec}-V_{CS1})\cdot D_1+(-V_O/2)\cdot D_2+(V_{rec}-V_{CS2})\cdot D_3=0$$

Figure 10:
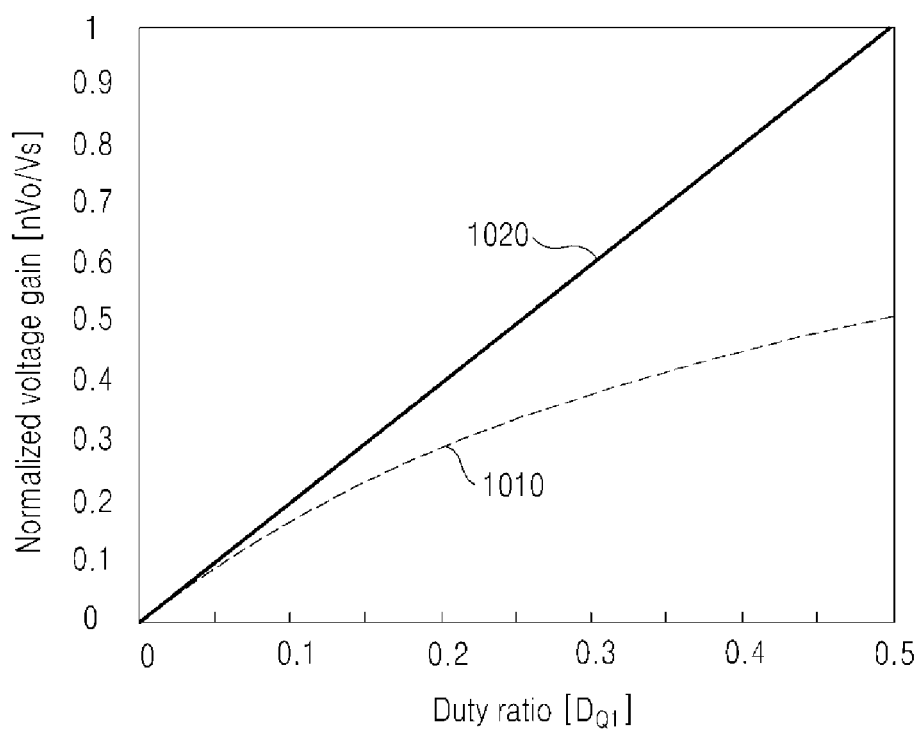
FIG. 10 is a graph showing a comparison between a voltage gain of the asymmetrical half-bridge converter according to an embodiment of the disclosure and that of a conventional technology.

FIG. 10 is a graph showing a comparison between a voltage gain of the asymmetrical half-bridge converter according to an embodiment of the disclosure and that of a conventional technology.

A voltage gain 1020 of the proposed asymmetrical half-bridge converter may be calculated by applying a voltage-time equilibrium principle to the magnetization inductor $L_m$ and output inductor $L_O$ of the transformer. Assuming that $L_m$ and $L_O$ are sufficiently large, a voltage gain $V_O/V_S$ of the proposed circuit is represented as follows:

$$V_O/V_S=2D_{Q1}/n \qquad (1)$$

In Equation 1, $D_{Q1}$ is a duty cycle of the first switch of the primary-side circuit, and n is a turn ratio of the primary-side circuit and the secondary-side circuit.

When $2D_{Q1}(1-D_{Q1})/n$, that is, the voltage gain 1010 of the existing asymmetrical half-bridge converter, is compared with Equation (1), the proposed circuit has a twice voltage gain when a time ratio is 0.5. This may be drawn in a graph form as shown in FIG. 10.

Figure 11A:
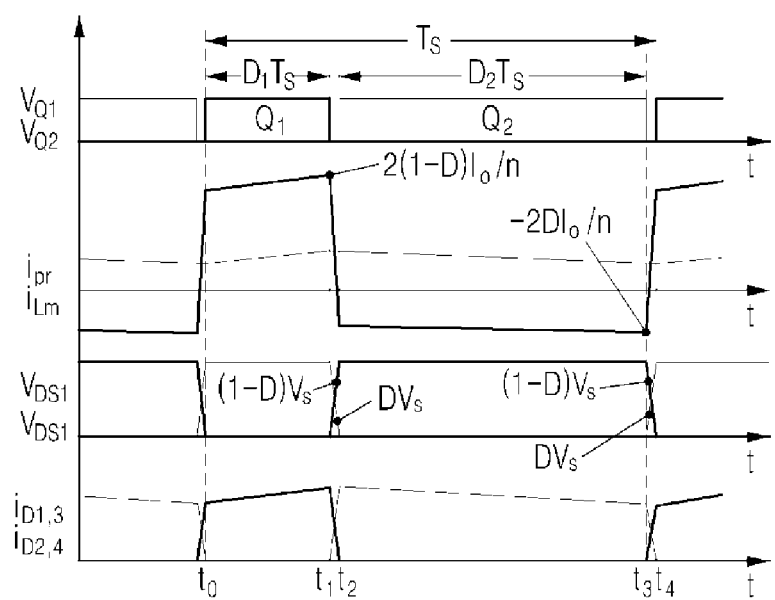
FIG. 11A is a diagram showing the zero-voltage switching condition of the asymmetrical half-bridge converter according to a conventional technology.
Figure 11B:
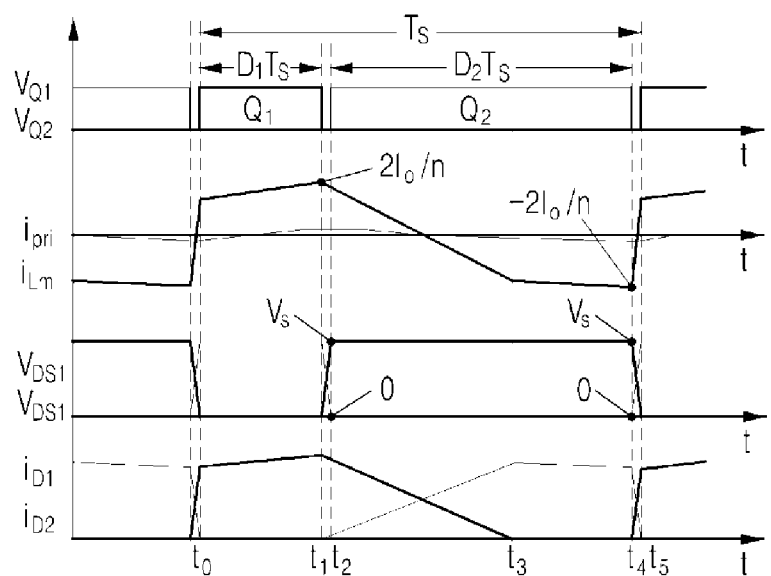
FIG. 11B is a diagram showing the zero-voltage switching condition of the asymmetrical half-bridge converter according to an embodiment of the disclosure.
Figure 11C:
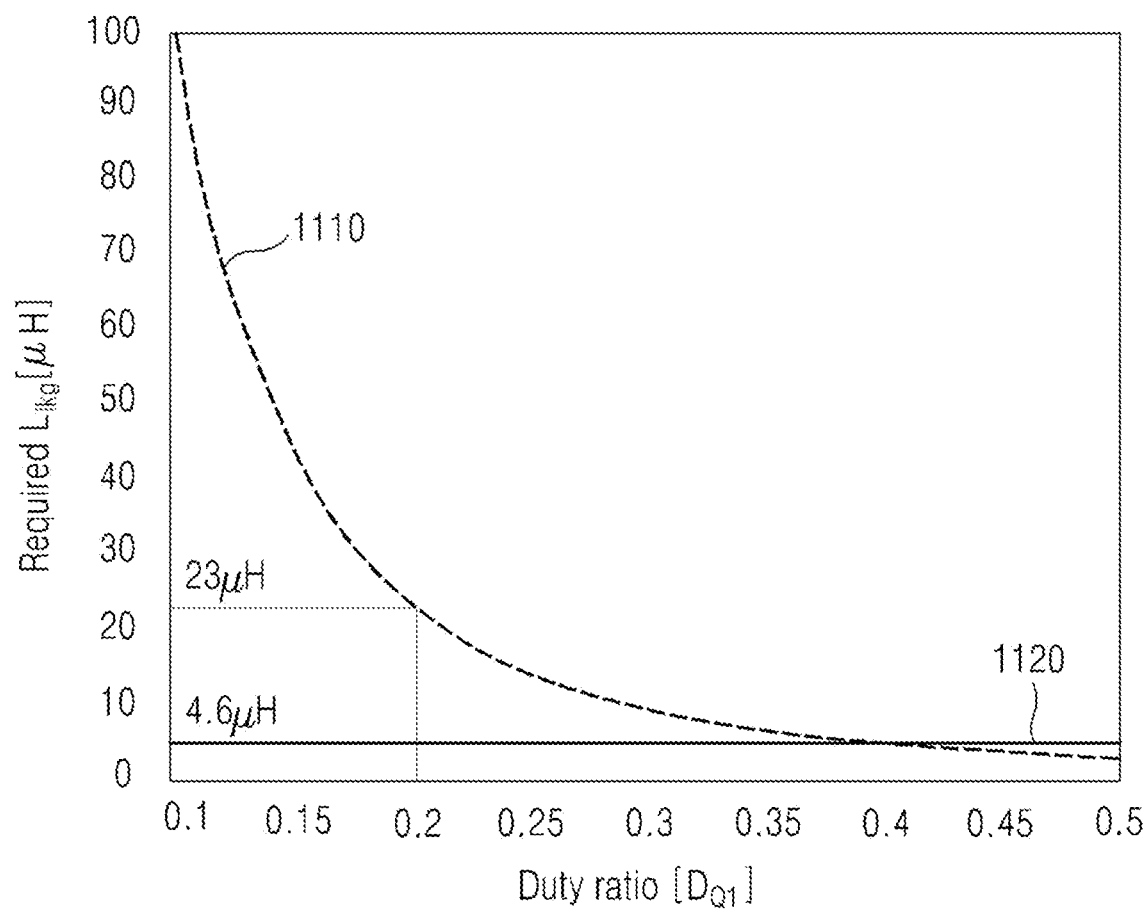
FIG. 11C is a graph showing a comparison between the zero-voltage switching conditions in the conventional technology and the proposed circuit.

FIG. 11A-11C is a graph showing a comparison between a zero-voltage switching condition of the asymmetrical half-bridge converter according to an embodiment of the disclosure and that of a conventional technology.

In the existing asymmetrical half-bridge converter, the first switch $Q_1$ and the second switch $Q_2$ have different zero-voltage switching conditions. Assuming that the output capacitors $C_{OSS}$ of $Q_1$ and $Q_2$ have the same value, the zero-voltage switching conditions of $Q_1$ and $Q_2$ are represented as follows.

$$\tfrac{1}{2}L_{lkg}(-2D_{Q1}I_O/n)^2 \geq C_{OSS}(1-D_{Q1})V_S^2 \quad (2)$$

$$\tfrac{1}{2}L_{lkg}(2(1-D_{Q1})I_O/n)^2 \geq C_{OSS}D_{Q1}V_S^2 \quad (3)$$

The asymmetrical half-bridge converter has a small $D_{Q1}$ when an input voltage is high. Accordingly, it can be seen that zero-voltage switching energy of $Q_1$ is very insufficient compared to $Q_2$ through Equations (2) and (3).

In the case of the proposed circuit, the zero-voltage switching conditions of Q1 and Q2 are represented as follows.

$$\tfrac{1}{2}L_{lkg}(-2I_O/n)^2 \geq C_{OSS}V_S^2 \quad (4)$$

$$\tfrac{1}{2}L_m(2I_O/n)^2 \geq C_{OSS}V_S^2 \quad (5)$$

As shown in Equation (5), in the case of $Q_2$, zero-voltage switching is possible regardless of a load if a dead time is sufficient because $L_m$ is involved in the zero-voltage switching. Furthermore, in the case of $Q_1$, energy necessary to achieve zero-voltage switching is greater than that of Equation (2), but zero-voltage switching is better achieved because it has a higher negative current than that of a conventional technology. An $L_{lkg}$ value for achieving zero-voltage switching of $Q_1$ in an experiment condition may be calculated as in FIG. 11C through Equations (4) and (5). From FIG. 11C, it can be seen that if $D_{Q1}$ is 0.5, a very small $L_{lkg}$ value is necessary for zero-voltage switching because the offset current of the transformer is not present even in the zero-voltage switching condition 1110 of in the existing circuit. However, if a circuit is designed in a wide input voltage range, when an input voltage is high, $D_{Q1}$ has a small value. Accordingly, the existing asymmetrical half-bridge converter requires a large $L_{lkg}$ value compared to the zero-voltage switching condition 1120 of the proposed circuit.

Figure 12A:
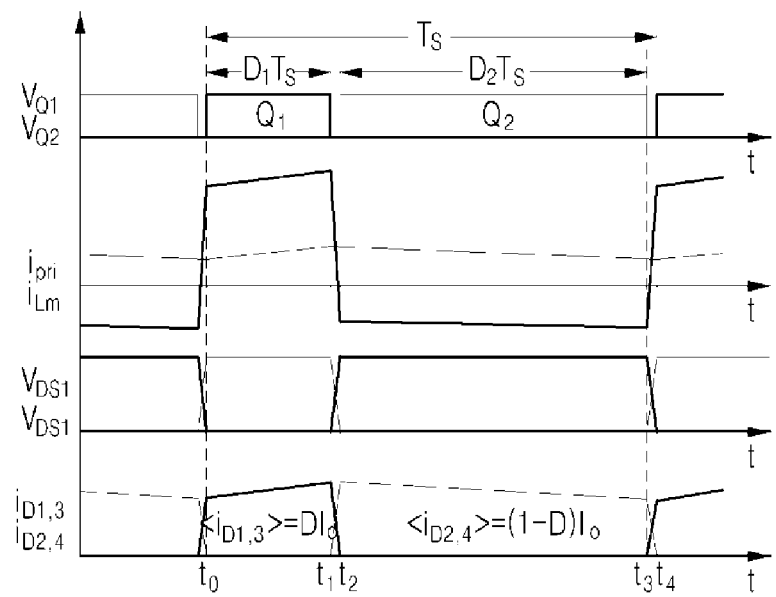
FIG. 12A is a timing diagram for describing a rectifier conduction loss of the asymmetrical half-bridge converter according to a conventional technology.
Figure 12B:
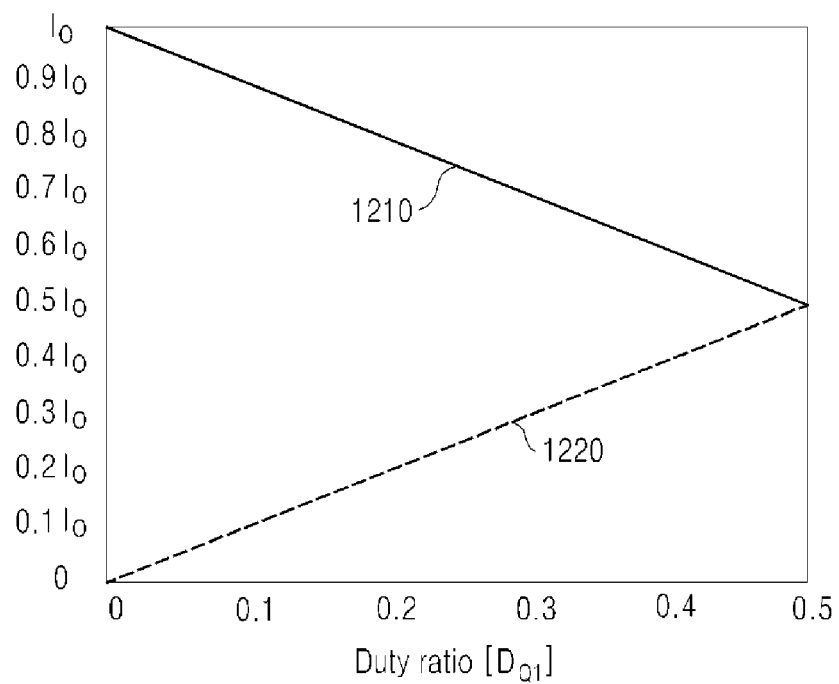
FIG. 12B is a graph showing an average conduction current flowing through the second diode and the fourth diode and an average conduction current flowing through the first diode and the third diode.

FIG. 12A-12B is a diagram for describing a rectifier conduction loss of the asymmetrical half-bridge converter according to a conventional technology.

A conduction loss in the first diode $D_1$ and the third diode $D_3$ according to a conventional technology is as follows:

$$\int_{t_0}^{t_1} i_{D1,3} dt = DI_O$$

$$\therefore P_{cond} = 2DI_O \cdot V_{F\_D1,3}$$

A conduction loss in the second diode $D_2$ and the fourth diode $D_4$ according to a conventional technology is as follows:

$$\int_{t_2}^{t_3} i_{D2,4} dt = (1-D)I_O$$

$$\therefore P_{cond} = 2(1-D)I_O \cdot V_{F\_D2,4}$$

Figure 13A:
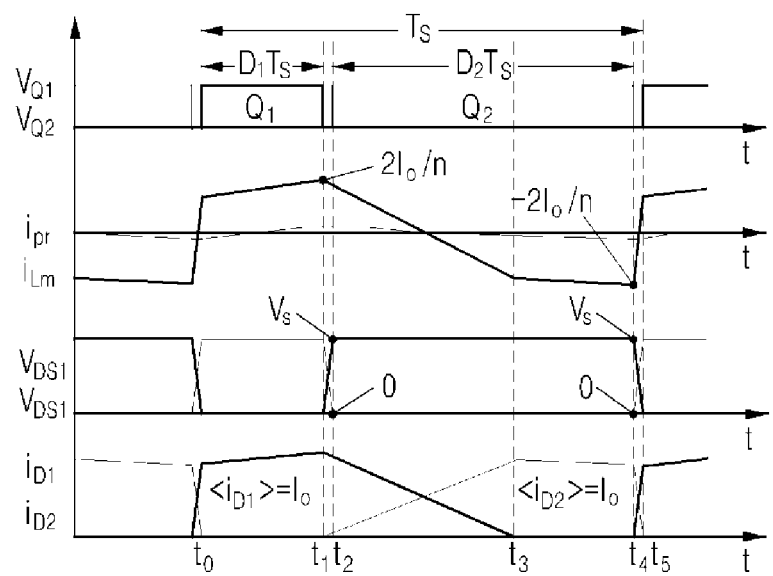
FIG. 13A is a timing diagram for describing the rectifier conduction loss of the asymmetrical half-bridge converter according to an embodiment of the disclosure.
Figure 13B:
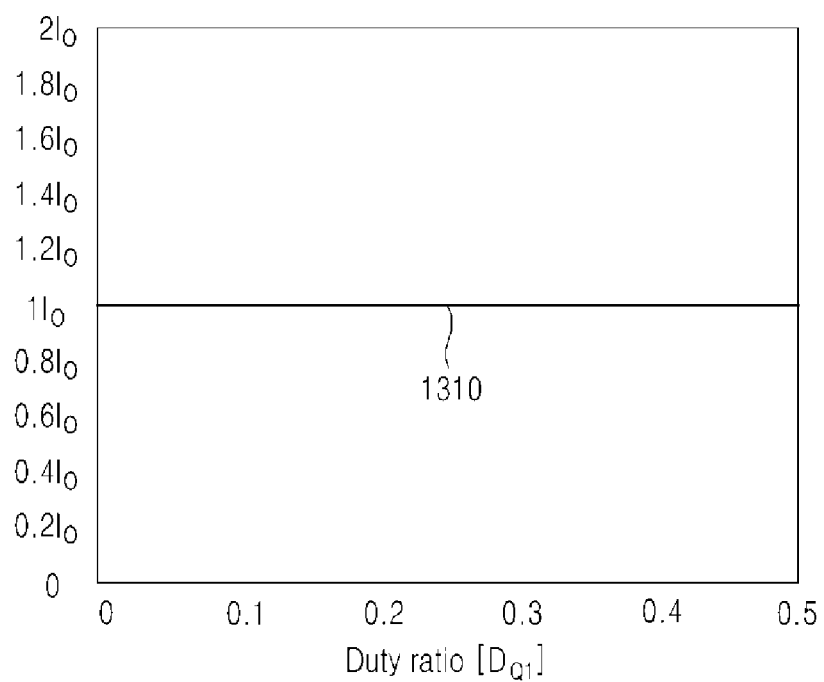
FIG. 13B is a graph showing an average conduction current 1030 flowing through the first diode and the second diode.

FIG. 13A-13B is a diagram for describing a rectifier conduction loss of the asymmetrical half-bridge converter according to an embodiment of the disclosure.

A conduction loss in the first diode $D_1$ according to an embodiment of the disclosure is as follows:

$$\int_{t_0}^{t_1} i_{D1} dt = I_O$$

$$\therefore P_{cond} = I_O \cdot V_{F\_D1}$$

A conduction loss the second diode $D_2$ according to an embodiment of the disclosure is as follows:

$$\int_{t_0}^{t_2} i_{D2} dt = I_O$$

$$\therefore P_{cond} = I_O \cdot V_{F\_D2}$$

Figure 14:
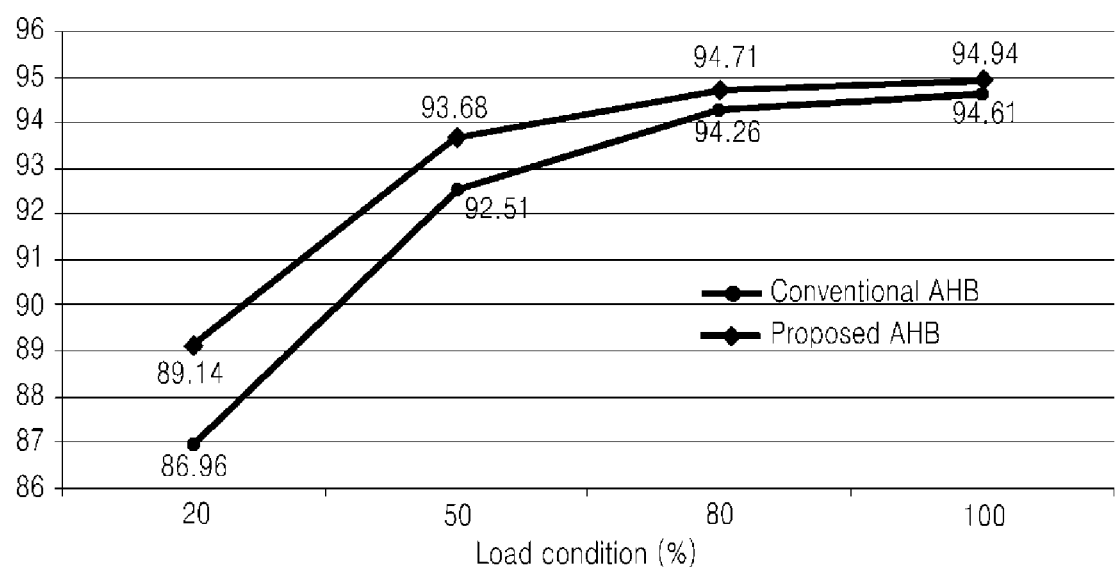
FIG. 14 is a graph showing a comparison between efficiency of the proposed circuit and efficient of the existing asymmetrical half-bridge converter in a full load region according to an embodiment of the disclosure.

FIG. 14 is a graph showing a comparison between efficiency of the proposed circuit and efficient of the existing asymmetrical half-bridge converter in a full load region according to an embodiment of the disclosure.

In order to prove the aforementioned contents, experiments were performed through prototype converters having an input of 250-400V and an output of 100V/200 W. Table 1 shows design values of the existing asymmetrical half-bridge converter and the proposed converter. μs

TABLE 1

|  | Existing asymmetrical half-bridge | Proposed circuit |
|---|---|---|
| Transformer ($L_m$, $N_p$:$N_s$) | PQ3220 (400 μH, 24:25) | PQ2620 (400 μH, 22:10) |
| Additional inductor $L_{lkg}$ | 25 μH | 7 μH |
| Zero-voltage switching of $Q_1$ | 100% load | 100% load |
| Zero-voltage switching of $Q_2$ | Full load condition | Full load condition |
| Rectifier diode $D_1$ | MBR440250 (250 V, $V_F$ = 0.62) | MBR440250 (250 V, $V_F$ = 0.62) |
| Rectifier diode $D_2$ | SCS210AM (650 V, $V_F$ = 1.4) | SCS210AM (650 V, $V_F$ = 1.4) |
| Rectifier diode $D_3$ | MBR440250 (250 V, $V_F$ = 0.62) | — |
| Rectifier diode $D_4$ | SCS210AM (650 V, $V_F$ = 1.4) | — |
| Rectifier capacitor $C_{S1}$ | — | 100 MPH 106*2 ca (10 μF, 100 V) |
| Rectifier capacitor $C_{S2}$ | — | 250 MPH 106*2 ca (10 μF, 250 V) |
| Output inductor ($L_o$, wire) | PQ2620 (400 μF, 0.1Φ*40) | PQ3220 (3010 μF, 0.1Φ*40 2 ca) |

As shown in Table 1, in the existing circuit, $L_{lkg}$ of 25 pH was necessary for the zero-voltage switching of $Q_1$ in a load condition of 100%. In contrast, in the proposed circuit, zero-voltage switching was possible in the same condition using $L_{lkg}$ of 7 μH. Furthermore, a high transformer turn ratio could be used because a time ratio-loss was reduced due to a small $L_{lkg}$ value.

As described above, the proposed circuit can reduce a core loss by removing the DC offset current of the transformer, and can better achieve zero-voltage switching compared to the conventional technology through a small $L_{lkg}$ value using a high negative current. Due to such characteristics, the proposed converter could achieve high efficiency in a full load region compared to the existing converter.

Efficiency of the converter is one of the most important characteristic indicating performance of the converter. 1% improvement of efficiency may seem to be small, but is a significantly meaningful value in the power electronics field. For example, if efficiency of 97% becomes 98%, efficiency is 1% improvement, but corresponds to a value by about 33% reduced in terms of a loss. The size and cost of a heat-dissipation system can be reduced by 33% because a burden of the heat-dissipation system is reduced as much as heat generated due to the loss is reduced. As described above, grades are classified according to efficiency because efficiency is important, and values thereof are determined.

In order to use a diode, an RCD clamp circuit must be used to prevent voltage ringing. Accordingly, one resistor, one capacitor, and one diode are used for one diode. In terms of the cost and the number of elements of the converter, the asymmetrical half-bridge converter according to an embodiment of the disclosure can significantly reduce the number of elements because it uses the capacitor instead of the diode. Accordingly, the asymmetrical half-bridge converter according to an embodiment of the disclosure can be reduced in size due to a volume reduction, and can reduce costs due to a small number of elements. In particular, in a conventional technology, in the case of the diode, costs are very high because an SiC diode having an internal voltage of 600V must be used.

The asymmetrical half-bridge converter according to an embodiment of the disclosure can significantly improve performance in terms of a loss of the transformer and the switch because it removes an offset current, that is, the greatest problem with the existing half-bridge converter. Furthermore, the asymmetrical half-bridge converter has an advantage in terms of costs because it has a small number of elements. Accordingly, the asymmetrical half-bridge converter according to an embodiment of the disclosure is very advantageous for commercialization because it improves the disadvantages of the existing half-bridge converter and also does not increase costs. Furthermore, the circuit of the proposed converter is very simple, and a control scheme used in the existing converter can be equally applied. Accordingly, a danger factor that needs to be experienced in order to adopt a new technology is reduced, and the existing fabrication system can be used almost without any change.

The aforementioned apparatus may be implemented in the form of a hardware component, a software component or a combination of a hardware component and a software component. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server. Examples of the program instruction may include machine-language code, such as code written by a compiler, and high-level language code executable by a computer using an interpreter. The hardware apparatus may be configured to operate one or more software modules in order to perform an operation of an embodiment, and vice versa.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

The embodiments of the disclosure can provide the asymmetrical half-bridge converter, which has a small number of elements and from which the DC offset current of a transformer has been removed by applying the rectifier having a new structure using the coupling inductor so that the converter is suitable for being used for a low-capacity and high-efficiency power supply.

What is claimed is:
1. An asymmetrical half-bridge converter, comprising a primary-side circuit comprising a first switch, a second switch, a primary-side capacitor, an additional inductor, and a primary-side magnetization inductor,
   wherein a secondary-side circuit comprises:
   a first diode and second diode which are connected in series;
   a first capacitor and second capacitor which are connected in series;
   a secondary-side rectification inductor having one end connected to an anode of the first diode and cathode of the second diode, which are connected in series, and having the other end connected between the first capacitor and the second capacitor which are connected in series;
   a first coupling inductor having one end connected to a cathode of the first diode and having the other end connected to the first capacitor; and a second coupling inductor having one end connected to an anode of the second diode and having the other end connected to the second capacitor;
wherein an average current flowing into the first capacitor and the second capacitor is set to 0 and an average current flowing into the secondary-side circuit becomes 0 regardless of an operation of the switches of the primary-side circuit.

2. The asymmetrical half-bridge converter of claim 1, wherein a DC offset current of the secondary-side circuit is removed by the first coupling inductor and second coupling inductor of the secondary-side circuit.

3. The asymmetrical half-bridge converter of claim 2, wherein a range of an input voltage is widened and a size of the converter is reduced by removing the DC offset current of the secondary-side circuit.

4. The asymmetrical half-bridge converter of claim 1, wherein zero-voltage switching efficiency of the switches is improved by increasing a negative current of the primary-side circuit.

5. An asymmetrical half-bridge converter, comprising a primary-side circuit comprising a first switch, a second switch, a primary-side capacitor, an additional inductor, and a primary-side magnetization inductor,
wherein a secondary-side circuit comprises:
a first diode and second diode which are connected in series;
a first capacitor and second capacitor which are connected in series;
a secondary-side rectification inductor having one end connected to an anode of the first diode and cathode of the second diode, which are connected in series, and having the other end connected between the first capacitor and the second capacitor which are connected in series;
a first coupling inductor having one end connected to a cathode of the first diode and having the other end connected to the first capacitor; and
a second coupling inductor having one end connected to an anode of the second diode and having the other end connected to the second capacitor;
wherein a voltage gain ($V_O/V_S$) of the converter is equal to an equation below:

$$V_O/V_S = 2D_{Q1}/n$$

wherein $D_{Q1}$ is a duty cycle of the first switch of the primary-side circuit, and n is a turn ratio of the primary-side circuit and the secondary-side circuit.

6. An asymmetrical half-bridge converter, comprising a primary-side circuit comprising a first switch, a second switch, a primary-side capacitor, an additional inductor, and a primary-side magnetization inductor,
wherein a secondary-side circuit comprises:
a first diode and second diode which are connected in series;
a first capacitor and second capacitor which are connected in series;
a secondary-side rectification inductor having one end connected to an anode of the first diode and cathode of the second diode, which are connected in series, and having the other end connected between the first capacitor and the second capacitor which are connected in series;
a first coupling inductor having one end connected to a cathode of the first diode and having the other end connected to the first capacitor; and
a second coupling inductor having one end connected to an anode of the second diode and having the other end connected to the second capacitor;
wherein zero-voltage switching conditions of the first switch and second switch of the primary-side circuit are equal to equations below, respectively:

$$\tfrac{1}{2}L_{lkg}(-2I_O/n)^2 \geq C_{OSS}V_S^2$$

$$\tfrac{1}{2}L_m(-2I_O/n)^2 \geq C_{OSS}V_S^2$$

wherein $L_{lkg}$ is the additional inductor of the primary-side circuit, $I_O$ is an output current of the secondary-side circuit, n is a turn ratio of the primary-side circuit and the secondary-side circuit, and $C_{oss}$ is an output capacitor of the primary-side circuit.

7. An operating method of an asymmetrical half-bridge converter, comprising a primary-side circuit comprising a first switch, a second switch, a primary-side capacitor, an additional inductor, and a primary-side magnetization inductor, and a secondary-side circuit comprising a first diode and second diode which are connected in series, a first capacitor and second capacitor which are connected in series, a secondary-side rectification inductor having one end connected to an anode of the first diode and cathode of the second diode, which are connected in series, and having the other end connected between the first capacitor and the second capacitor which are connected in series, a first coupling inductor having one end connected to a cathode of the first diode and having the other end connected to the first capacitor, and a second coupling inductor having one end connected to an anode of the second diode and having the other end connected to the second capacitor, the method comprising:
a step in which the first switch of the primary-side circuit is turned on and the first diode of the secondary-side circuit is turned on;
a step in which the first switch of the primary-side circuit is turned off and the first diode of the secondary-side circuit is turned on;
a step in which the second switch of the primary-side circuit is turned on, the first diode of the secondary-side circuit is turned on, and the second diode of the secondary-side circuit is turned on;
a step in which the second switch of the primary-side circuit is turned on and the second diode of the secondary-side circuit is turned on; and
a step in which the second switch of the primary-side circuit is turned off and the second diode of the secondary-side circuit is turned on;
wherein an average current flowing into the first capacitor and the second capacitor is set to 0 and an average current flowing into the secondary-side circuit becomes 0 regardless of an operation of the switches of the primary-side circuit.

8. The method of claim 7, wherein in the step in which the first switch of the primary-side circuit is turned on and the first diode of the secondary-side circuit is turned on, an output current flows through the second capacitor and first diode of the secondary-side circuit.

9. The method of claim 7, wherein in the step in which the first switch of the primary-side circuit is turned off and the first diode of the secondary-side circuit is turned on, when a voltage of the rectification inductor of the secondary-side circuit reaches a predetermined voltage, the second diode becomes conductive.

10. The method of claim 7, wherein in the step in which the second switch of the primary-side circuit is turned on, the first diode of the secondary-side circuit is turned on, and the second diode of the secondary-side circuit is turned on, when a voltage of the magnetization inductor of the primary-side circuit is clamped to a predetermined voltage, a current flows between the first diode and second diode of the secondary-side circuit.

11. The method of claim 7, wherein in the step in which the second switch of the primary-side circuit is turned on and the second diode of the secondary-side circuit is turned on, the first diode of the secondary-side circuit is turned off, and an output current flows through the first capacitor and second diode of the secondary-side circuit.

12. The method of claim 7, wherein in the step in which the second switch of the primary-side circuit is turned off and the second diode of the secondary-side circuit is turned on, when a voltage of the rectification inductor of the secondary-side circuit reaches a predetermined voltage, the second diode of the secondary-side circuit becomes conductive, and a current flows between the first diode and second diode of the secondary-side circuit.

13. The method of claim 7, wherein a DC offset current of the secondary-side circuit is removed by the first coupling inductor and second coupling inductor of the secondary-side circuit.

14. The method of claim 7, wherein a range of an input voltage is widened and a size of the converter is reduced by removing a DC offset current of the secondary-side circuit.

15. The method of claim 7, wherein zero-voltage switching efficiency of the switch is improved by increasing a negative current of the primary-side circuit.

* * * * *